(12) United States Patent
Parcel

(10) Patent No.: US 9,544,324 B2
(45) Date of Patent: Jan. 10, 2017

(54) SYSTEM AND METHOD FOR MANAGED SECURITY ASSESSMENT AND MITIGATION

(71) Applicant: Trustwave Holdings, Inc., Chicago, IL (US)

(72) Inventor: Scott Parcel, Cupertino, CA (US)

(73) Assignee: TRUSTWAVE HOLDINGS, INC., Chicago, IL (US)

( * ) Notice: Subject to any disclaimer, the term of this patent is extended or adjusted under 35 U.S.C. 154(b) by 0 days.

(21) Appl. No.: 13/786,314

(22) Filed: Mar. 5, 2013

(65) Prior Publication Data

US 2014/0259173 A1   Sep. 11, 2014
US 2016/0065607 A9   Mar. 3, 2016

Related U.S. Application Data

(60) Provisional application No. 61/634,587, filed on Mar. 2, 2012.

(51) Int. Cl.
```
H04L 29/06      (2006.01)
G06F 21/55      (2013.01)
G06F 21/70      (2013.01)
G06F 21/57      (2013.01)
H04L 29/08      (2006.01)
```

(52) U.S. Cl.
CPC .......... H04L 63/1433 (2013.01); G06F 21/55 (2013.01); G06F 21/577 (2013.01); G06F 21/70 (2013.01); H04L 63/1408 (2013.01); *G06F 2221/03* (2013.01); *G06F 2221/034* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 6,453,345 | B2* | 9/2002 | Trcka | G06F 21/552 709/223 |
| 7,185,232 | B1* | 2/2007 | Leavy | H04L 12/2697 714/32 |
| 7,340,597 | B1* | 3/2008 | Cheriton | G06F 21/554 713/100 |
| 7,783,740 | B2* | 8/2010 | Siorek | H04L 43/02 370/252 |
| 2006/0161653 | A1* | 7/2006 | Webb | H04L 63/1433 709/224 |
| 2008/0005782 | A1* | 1/2008 | Aziz | G06F 9/45537 726/3 |
| 2008/0034424 | A1* | 2/2008 | Overcash et al. | 726/22 |
| 2010/0106742 | A1* | 4/2010 | Guruswamy | 707/773 |
| 2010/0325615 | A1* | 12/2010 | Ramot | 717/124 |
| 2011/0047118 | A1* | 2/2011 | Keith, Jr. | 706/47 |

* cited by examiner

*Primary Examiner* — Morshed Mehedi
*Assistant Examiner* — Shu Chun Gao
(74) *Attorney, Agent, or Firm* — Hanley, Flight and Zimmerman, LLC.

(57) ABSTRACT

In an embodiment of the invention, a system for assessing vulnerabilities includes: a security management system; a network device in a system under test (SUT), wherein the network device is privy to traffic in the SUT; and wherein the SMS is privy to traffic that is known by the network device and/or to one or more traffic observations that is known by the network device.

15 Claims, 14 Drawing Sheets

1

SYSTEM AND METHOD FOR MANAGED SECURITY ASSESSMENT AND MITIGATION

CROSS REFERENCE TO RELATED APPLICATIONS

This patent claims the benefit of and priority to U.S. Provisional Patent Application 61/634,587, by Scott Parcel, filed Mar. 2, 2012. U.S. Provisional Patent Application 61/634,587, is hereby incorporated herein by reference in its entirety.

TECHNICAL FIELD

Embodiments of the invention relate generally to systems for assessing vulnerabilities.

BACKGROUND

Securing of internet applications (and intranet and web applications) and/or other applications involves some combination of "black box" scanning of the application in order to search for vulnerabilities, scanning the source code to identify vulnerabilities, using a firewall or a suitable intrusion prevention system to detect and block certain vectors and malicious behaviors, and/or modifying the infrastructure or implementation of the application to correct the vulnerabilities. One example of such scans for searching for vulnerabilities is by injection of vectors.

Developments in network technology also include Application Delivery Controllers and Web Application Firewalls. These two developments can access the network traffic to and from web servers and can provide more vulnerability protection than the traditional firewall. The accessed network traffic includes decrypted data.

Other network technology developments include deep packet inspection capabilities and other application assessment capabilities, tunneling methods, data sharing methods, and cloud-based services.

As network technology advances, there is a continuing and important need to also improve security of internet applications and improve discovery methods of vulnerabilities. There is also a continuing need to motivate an advancement in the blocking of vulnerabilities.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Reference will now be made in detail to the present embodiment(s) (exemplary embodiments) of the present disclosure, an example(s) of which is (are) illustrated in the accompanying drawings. Wherever possible, the same reference numbers will be used throughout the drawings to refer to the same or like parts.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Figure 1:
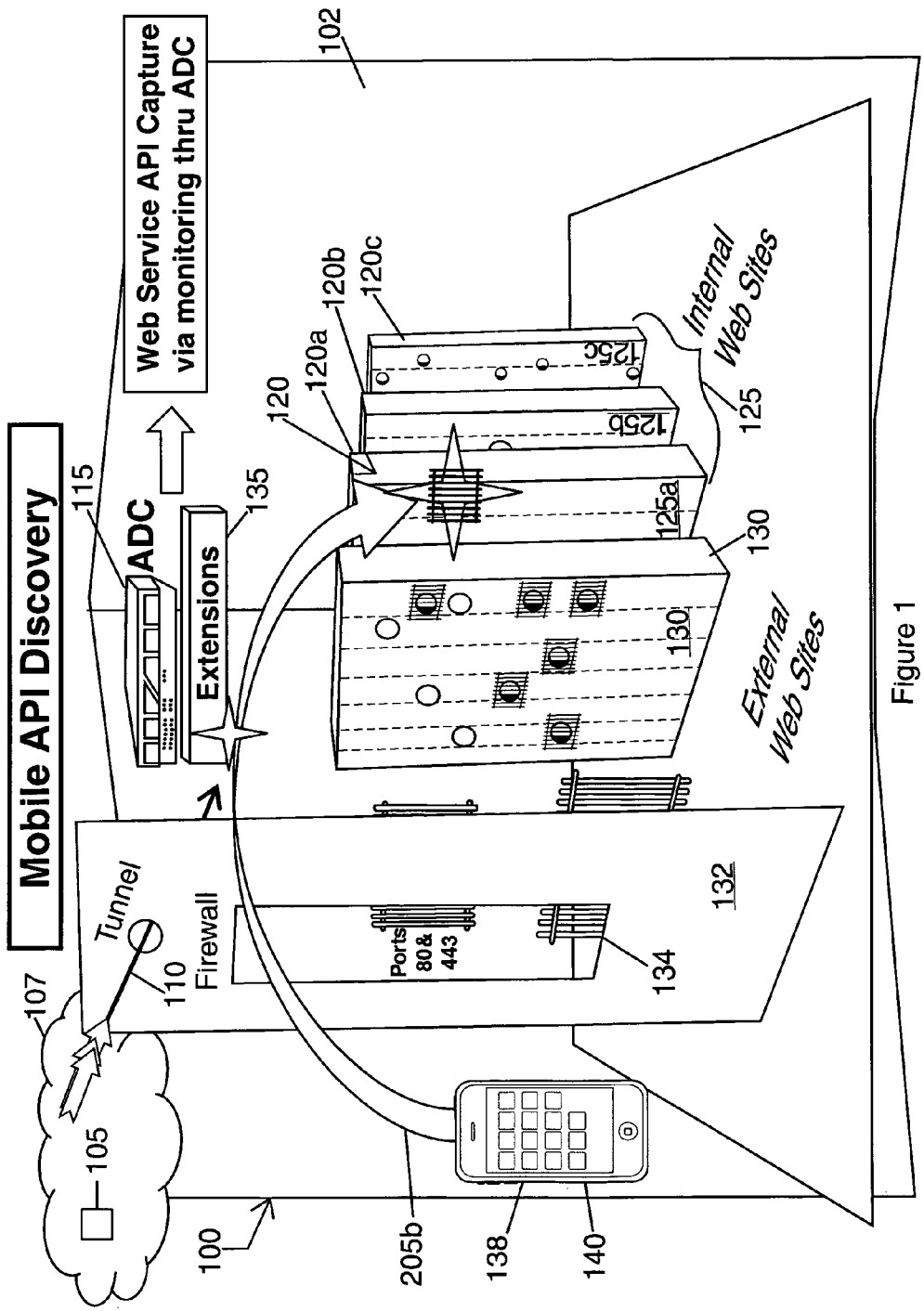
FIG. 1 is a graphics block diagram of a system in accordance with a first embodiment of the invention.
Figure 2:
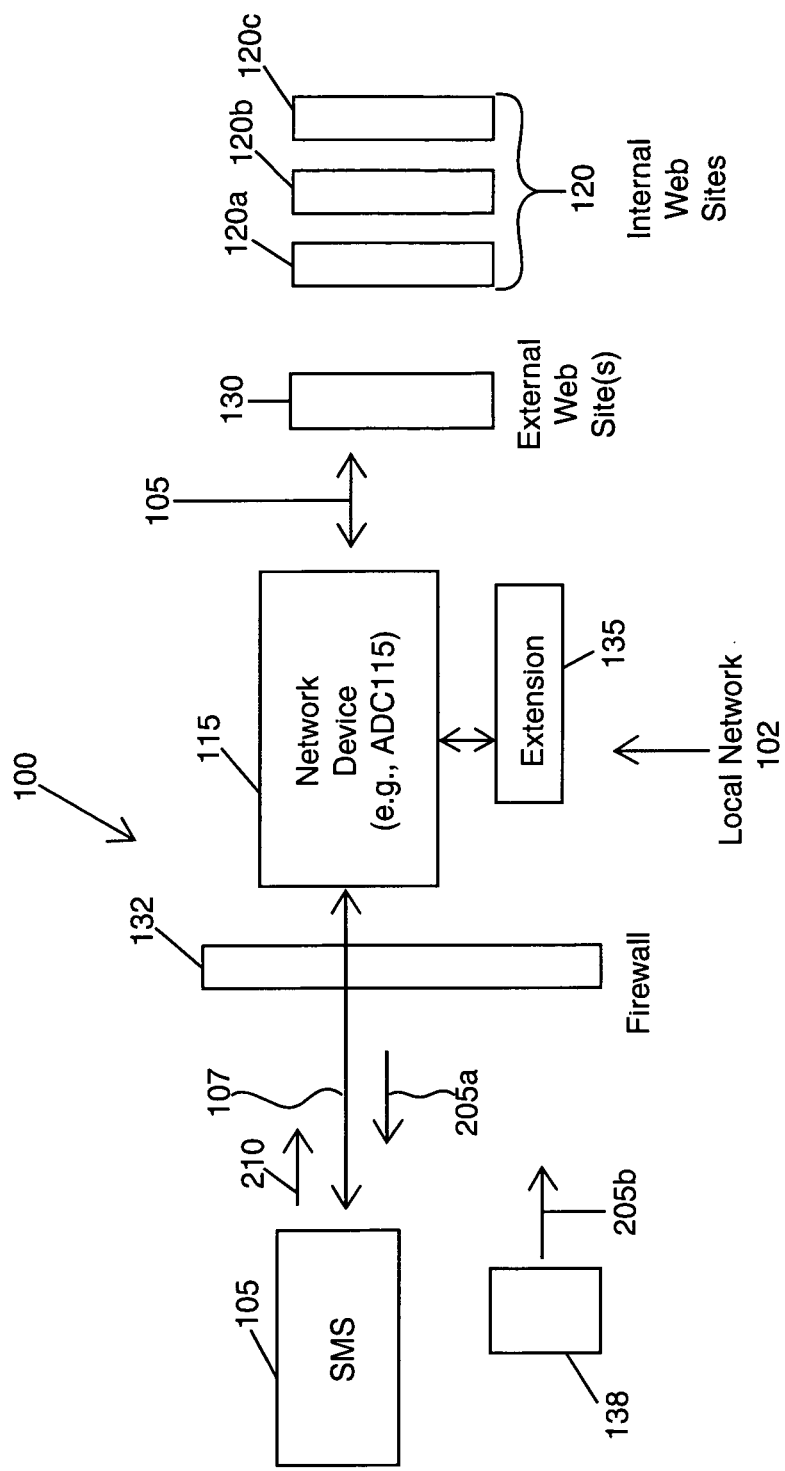
FIG. 2 is a functional block diagram of the system in FIG. 1 in accordance with the first embodiment of the invention.

FIG. 1 is a graphics block diagram of a system 100 in accordance with a first embodiment of the invention. The system 100 can automatically identify and then utilize the attack surface (i.e., request types) of web applications and web service APIs (Application Program Interface) by allowing observation of normal traffic or guided traffic to these APIs. As a result, the system 100 permits a faster and/or easier assessment of more (a larger quantity) of mobile application web services. FIG. 2 is a functional block diagram of the system 100 in FIG. 1 in accordance with the first embodiment of the invention.

Referring now to both FIG. 1 and FIG. 2, in an embodiment, the system 100 allows a security management system 105 (SMS 105) to use a cloud-based scanning service and tunneling 108 so that the scanning service can access, via the ADC 115 (Application Delivery Controller 115), the one or more internal applications 120 (e.g., applications 120*a*, 120*b*, and 120*c*), where the ADC 115 has access to an internal application 120. For convenience, the security testing system 105 will be referred herein as an SMS 105. The SMS 105 can perform security-related management functions (e.g., scans, fault injections, etc.) and has an awareness and ability to facilitate the full cycle of scan and block/remediate. The ADC 115 has some knowledge of and/or cooperates with the SMS 105 so-as to maximally facilitate convenient scanning of internal applications and/or communication with the ADC itself. Note also that such tunneling or other communications may be facilitated by the ADC 115 reaching out through firewalls (as is typically allowed for internal devices) to communicate to the scanner (in the SMS 105) to supply it information, as well as to coordinate tunnel setup, even though the scanner may not have access to communicate in through the firewall to the ADC.

It is noted that the ADC 115 may be configured alternatively to perform the tunneling 108. The applications 120 are within a system under test (SUT) 102 which may be, for example, a local network or corporate network.

The ADC 115 can be any suitable network device 115 that is not necessarily an application delivery controller, as long as the network device 115 is privy to traffic flowing through the internal applications in the SUT 102.

The SMS 105 is a security testing system that can test for application vulnerabilities in a SUT 102. The internal applications 120 may be in an internal network 125 (or internal website 125). The external website 130 (or external application 130) and the internal website 125 are communicatively coupled together. Additionally, the ADC 115 may be integrated with a cloud service 107 that is also used by the SMS 105. Therefore, the system 100 will advantageously leverage the capabilities provided by cloud-based components. Internal applications are just apps that are not normally accessable from the point of view of the sms without the aid of the connected network device.

The use of tunneling through the ADC allows a rapid mass assessments of internal applications as discussed below and also avoids the delays and expense of adding dedicated hardware appliances that would otherwise be required in conventional systems that scan for vulnerabilities. Alternatively, the tunneling functionality 108 may be provided by the ADC 115.

The SMS 105 will typically provide a user interface that allows a user to be able to test a web service API for vulnerabilities and to allow retrieval of a URL, information about a URL, and/or information of a location of an API of a target system to be tested. The user then uses the SMS 105 to inform the ADC 115 to capture (or record) traffic 205 (FIG. 2) that flows through the ADC 115. The sample of traffic to be captured can be filtered based on, a given time window, a given number of traffic flow (or requests), a given amount of traffic flow that occurs after a latest request, traffic flow recorded before a manual termination of the traffic flow recording function, or another termination condition that terminates recording of the traffic flow through the ADC 115.

The user can also narrow, via the SMS 105, the traffic to be captured by the ADC 115 and to be provided by the ADC 115 to the SMS 105 as traffic flow information 205a (FIG. 2). The user can narrow the traffic 205 to be captured by the ADC 115 based on, for example, an attribute of the traffic.

Additionally or alternatively, the user has an option to force a certain amount of traffic to flow through the ADC 115, whether or not traffic is currently or naturally flowing through the ADC 115. By way of example and not by way of limitation, the user could use a mobile device 138 (e.g., a smart phone or another wireless-capable computing device with a mobile application 140) to force additional traffic 205b to flow through the web service (which is provided by the external web site 130). This additional traffic flow through the web service will flow through the ADC 115, and, as a result, the ADC 115 can capture additional traffic flows and send traffic information (and/or aggregated observations)(relating to these additional traffic flows and any other traffic flow as selected by the user) to the SMS 105.

The traffic (which is captured by the ADC 115 and provided to the SMS 105) can be saved as traffic information by the SMS 105 and be used later by the SMS 105 in a traversal or a defined example of navigating through the web service for purposes of vulnerability scanning. Furthermore, the SMS 105 (or ADC 115) can further distill (or otherwise narrow) this saved traffic information to, for example, primitive unique elements or other criteria. Additionally or alternatively, the SMS 105 can use this saved traffic information in a predetermined sequence during the testing and use of the web service API function.

During subsequent testing, the SMS 105 can poll (or otherwise select) from the list of saved traffic information 205a (FIG. 2) and the saved traffic information is used to scan the system under test 102. The saved traffic information can be polled in various ways such as, for example, based on a sequential order as the saved traffic information was originally captured, based on another attribute(s) observed in the list of saved traffic information (which can included saved captured requests). The saved captured requests that are polled can then be sent by the SMS 105 to the web service API for purposes of web security testing. The saved captured request can be sent to the web service API, with or without fault injection in the captured requests transmitted to the web service API. The SMS 105 can then observe and record the responses and observations to these captured request transmitted to the web service API. An observation of characteristics of the web service, after a captured request (with or without a fault injection) is transmitted to the web service API would be, for example, a non-response after the captured request is transmitted, or an expected response after the captured request is transmitted, a non-expected response after the captured request is transmitted to the SUT 102, or another observation of an occurrence or non-occurrence in the SUT 102

Therefore, the system 100 will leverage the capability of the ADC 115 to access the internal applications 125 that are not normally available through the external website 130 and internet. The system 100 allows the SMS 105 (or another outside resource 105) to scan for vulnerabilities in a system under test 125 (e.g., scan of internal applications 125 in the SUT 102) by use of the ADC 115, without the need to use an additional appliance in the network. These internal applications 125 (or system under test 125) are behind the firewall 132. Normally, the firewall 132 will allow requests through designated ports 134.

Additionally, the ADC 115 will include one or more extensions 135 to permit the SMS 105 to communicate with the ADC 115 and to permit the SMS 105 to scan the internal applications 125. The system 100 advantageously performs a web service API capture of information via monitoring performed through the ADC 115. Therefore, the ADC 115 facilitates the scanning of the internal applications 125 by the SMS 105 and facilitates the reporting of the scan results to the SMS 105 after the internal applications 125 are scanned. The scan results can then be used to determined and/or evaluate vulnerabilities or potential vulnerabilities. The scan results can also be advantageously used to create new tests that can be used for fault injection such as the fault injection methods described in commonly-assigned and commonly-owned U.S. Pat. No. 7,185,232. The ADC 115 can also be configured to participate in the scan activity, such as performing injections (and/or passive observations). Such additional functionalities can be provided by, for example, one or more extensions 135 that is in communication with the ADC 115. Other added functionalities for the ADC 115, as described herein in various embodiments of the invention, may also be provided via the one or more extensions 135.

In contrast, current scanning of web applications to find vulnerabilities normally relies only on the request and response data directly available to the scanner when interacting with the system under test. Therefore, current scanners are not privy to other communications to and from the tested application, such current scanning methods are limited in their abilities to detect the full impact of the testing and also limited in their abilities to understand and correlate the full scope of usage of an application in the SUT.

In contrast, the system 100 (via SMS 105) allows observation of the traffic flow to and from the tested application(s) 120 and of how a web service API is being used. The system 100 (via SMS 105) will capture this traffic flow information, as observed from flowing to and from the tested application(s) 120, and this traffic flow information can later be used for analysis, future vulnerability testing, and/or in the development of additional vulnerability testing methods.

The SMS 105 may also be configured to detect for undesirable impacts to the SUT 102. The SMS 105 detects undesirable impacts to the SUT if there is, for example, an unexpected response, a delayed response, or non-response from the SUT 102 based normal traffic and/or scans into the SUT 102.

In FIG. 1, a mobile application 140 can also access (via the external web sites 130) the various web services where the web service functionalities are provided by the internal web sites 125. It is noted, however, that certain versions of a web service API are not typically discoverable to current scanners. Different technologies are used in a web service, such as SOAP which has a definition language. However, there is no standard on the specification description of many other web services. Since there is no standard specification description for many web services, these web services are not possible to scan without having to create a proprietary description to allow scanning. Therefore, an embodiment of the invention solves the problem of the current technology by allowing the external SMS 105 to (via the ADC 115) observe, capture, and/or record the traffic to and from the web service API. Subsequently, traffic (or a selected sample of traffic) that is captured is then available for later analysis for existing or potential vulnerabilities, for use in a reproduced traffic for fault injection, and/or for other uses related to vulnerability analysis and/or network security analysis. Since the SMS 105 and ADC 115 are integrated together (or are in communication with each other or are otherwise communicatively coupled together), the system 100 provides an expedited method of vulnerability scanning and/or an improved method of vulnerability analysis. The SMS 105 being privy to the ADC 115 is defined as the SMS 105 being able to communicate with (or access or otherwise have knowledge of) the ADC 115.

In the example of FIG. 1, the server applications 125 are described as under test. The tests described in FIG. 1 may also be performed on a website with AJAX which is a group of interrelated web development techniques known to those skilled in the art.

The client 138 may also be under test or may not be under test. The client 138 is shown in FIG. 1 as a mobile client 138. However, the client 138 can be another type of computing device 138 that is not necessarily a mobile client.

The ADC 115 can be another type of network device 115 that is privy to traffic through the internal web sites 125, where the traffic is in un-encrypted form. If the traffic through the internal web sites 125 is un-encrypted, then the device 115 can be any type of network device 115 within the loop of traffic 205 (FIG. 2) that flows through the internal web sites 125 or is privy to the traffic 205 that flows through the internal web sites 125. Since encryption is commonly used, the device 115 is privy to the decrypted stream at the SSL termination point or other locations downstream from the SSL termination point.

The web application SMS 105 could be in a stand-alone hardware appliance or could be co-resident on another hardware appliance or on a cloud-based server. The SMS 105 has intelligence of the integration with the network device 115 (e.g., ADC 115) and has intelligence that the network device 115 is able to capture data or traffic flow. The SMS 105 can also be co-resident in the ADC 115 or another type of network device 115 in the SUT 102. The SMS 105 also performs certain functions such as receiving and/or recording the captured data or traffic flow information from the network device 115, exposes functional capabilities to users of the SMS 105, and exposes extended functional capabilities to users based on the integration of the SMS 105 with the network device 115 and/or based on the SMS 105 being able to leverage the capabilities and/or functionalities of the network device 115.

To facilitate the integration between the SMS 105 and network device 115 (e.g., ADC 115) and/or to facilitate the above-described communications between the SMS 105 and the network device 115, the integration or communications can be facilitated, for example, through various web service APIs, through any suitable network protocol by which two devices in a network can interface and communicate, and/or through communication capabilities provided by a cloud-based service, and/or through another suitable method known to those skilled the art.

After the traffic flow is captured and the SMS 105 has received, from the ADC 115, the traffic flow 205 (or related traffic flow information 205a as shown in FIG. 2), the user can filter the traffic flow information for viewing based on some filter criteria. For example, the SMS 105 can filter the traffic flow information that is viewed by the user, in response to commands by the user. The SMS 105 can also filter the traffic flow information that is viewed based on at least one of the following: (1) the user can view the full detail of all requests within a user-selected time period or within another user-selected criteria; (2) the user can view a subset of the request in item (1) above based on an additional criteria such as a unique request that was captured; and/or (3) another criteria.

Additionally, the ADC 115 captures the traffic (or summary thereof) in response to a user command to capture traffic, where this command is input by the user into the SMS 105. Additionally or alternatively, the SMS 105 can automatically request the ADC 115 to send captured traffic 205 (and/or traffic flow information 205a concerning the captured traffic 205), and/or to send a subset of the captured traffic 205 (and/or traffic flow information 205a concerning the captured traffic 205) based on user-provided settings provided into the SMS 105. The captured traffic flow information could later be used for vulnerability assessments or vulnerability testing. Additionally or alternatively, the user could send data that is interpreted as a command to the ADC 115, as a part of this traffic flow, to initiate the capture and subsequently to send the captured traffic (or summary thereof) to the SMS 105 or to control other SMS related activities.

The captured traffic flow information could also be used in real time to test for security vulnerabilities while the observation is performed on the traffic flow currently being captured by the ADC. For example, as the ADC 115 is capturing the traffic flow and sending the traffic flow or traffic flow related information to the SMS 105, the user of the SMS 105 can observe the captured traffic flow and concurrently the SMS 105 can use the captured traffic flow information as a baseline of additional requests that are concurrently transmitted to the web service and/or can concurrently perform fault injections and/or other modification in this baseline for transmission to the web service so that the SMS 105 can elicit information about potential vulnerabilities of the web service.

As noted herein, the network device 115 may be an ADC 115 or another type of network device. For example, in another embodiment, the network device 115 is a remote system that is in the loop regarding some traffic in the SUT 102. This can be, for example, a system 115 that a secondary email may flow to, and this system 115 will allow a user to observe traffic flow behavior and characteristics. Also, some of the injections may be uniquely identified so that when secondary communications are observed with these uniquely-identified injected values, the user (or, typically, the SMS 105) can trace back to the location (in the SUT 102) where that injection occurred in the communications.

Referring again to FIG. 2, the injections 210 from the SMS 210 can be fault injections, benign injections, and/or normal usage traffic. The SMS 210 can characterize (or can otherwise allow observations) of the impact (on the SUT 102 and/or SMS 105) of the fault injections, benign injections, normal usage traffic, and/or traffic in another usage mode (such as, e.g., usage modes where vulnerabilities are not being scanned).

In an embodiment, the ADC 115 can perform additional functions by the addition of, for example, the extensions 135. For example, the ADC 115 is configured to set up tunneling, to perform application discovery (where the ADC 115 performs the application discovery by looking at information configured into the ADC itself and/or performs the application discovery by sending discovery requests with the SUT 102), to alter the output from the SUT (such as injecting javascript into http responses from the SUT that can aid in various scanner functions, such as to initiate/terminate various capture processes), to perform other types of fault injections or benign injections, and/or performs other functions.

Other embodiments are also now described. The SMS 105 and network device 132 may be co-residents in the same device. Additionally or alternatively, more than one network device 115 may be used in the system 100. Additionally or alternatively, the network device 115 is software that is co-resident on one or more machines that are part of the SUT 105. Additionally or alternatively, the SMS 105 and/or network device 115 are co-resident with the SUT 102.

Additionally or alternatively, the SMS 105 is configured to request for traffic information from the network device 115. Additionally or alternatively, the SMS 105 can request for an analysis of the information to be performed, or already performed, on the network device 115.

Additionally or alternatively, the network device 115 is configured to serve only a passive observation function and not an active network function (such as an agent deployed on SUT machines to observe communications or state).

Additionally or alternatively, the network device 115 is configured to perform an analysis of the traffic information, and the SMS 105 is configured to request for the results of such an analysis. Additionally or alternatively, the network device 115 is configured to proactively send such information to the SMS 105.

Additionally or alternatively, the SMS 105 may be configured to not be privy to the traffic in the SUT, but rather, the SMS 105 may be configured to be privy to observations about traffic that are known by the network device 115.

Additionally or alternatively, the network device is configured to conveniently and dynamically set up tunneling between a remote SMS and one or more internal SUTs in a manner that is coordinated with the objectives, intended use, and/or state of the SMS or SUTs.

Additionally or alternatively, the network device is configured to facilitate application discovery by the SMS.

Additionally or alternatively, the network device comprises a Web Application Firewall (WAF).

Additionally or alternatively, the network device is an intelligent network switch, router, network firewall, IPS (Intrusion Prevention System), IDS (Intrusion Detection System), unified traffic manager, or any device or agent that is capable of observing all or a part of the communications between elements of the SUT, and/or between the SUT and external users or systems.

Additionally or alternatively, the network device may be configured by the SMS to interpret specified types of network traffic as a commands to the SMS or network device, for the purposes of initiating or terminating capture of certain traffic, and/or for activating other activities such as modifying existing traffic, and/or modifying mitigation rules.

This feature of interpreting certain traffic as commands is useful for situations where various users or clients do not have direct or convenient access to the SMS, but where it is desirable that these user or clients have some way to initiate various activities that are facilitated by the cooperating SMS and network device. Therefore, what would appear to be normal traffic to the SUT can have a special meaning that is recognized as a command. In one embodiment, the SMS 105 and/or network device 115 are configured to recognize the traffic to the SUT as being a command, and to act on that command. The SMS 105 (and/or the network device 115) may or may not pass along such traffic to the SUT once the traffic is identified as actually being a command versus input intended for actual use by the SUT.

Additionally or alternatively, any of the various embodiments of the invention may provide a system having one or more network device, one or more SMS, one or more WAF, and/or one or more other system or other device.

Other variations may also be possible.

In summary, current security testing of web applications and web services are commonly not able to properly exercise the system under test (i.e., target under test) because the scanner is unable to directly observe or elicit communications occurring through (or involving) the system under test. In an embodiment of the invention, the SMS 105 leverages (or is integrated with or is in communication with or is otherwise privy with) the ADC 115 which is, in turn, privy to all communications of the system under test (SUT) 102 (or is privy with at least a certain classes of communications of the SUT 102). The ADC 115 can then capture and forward at least some of this SUT communications to the SMS 105. The SMS 105 can save this SUT communications and use this additional information to facilitate a more complete testing of the SUT. For example, the SUT information may be observed as is and analyzed for potential vulnerabilities. As another example, this SUT information may be used as a baseline to elicit and observe responses of the SUT as this SUT information is later transmitted to the SUT. Therefore, the system 100 integrates and/or leverages the SMS 105 and ADC 115 in order to elicit and/or observe traffic that is not observable by traditional scanners.

As known to those skilled in the art, a web security scanner application will crawl or "spider" through an SUT, and responses (e.g. HTML, turbo-script, or a common technology format such as flash or other formats) from the SUT are parsed or interacted with in a common client side environment. For example, in the client side environment, the security test personnel can automatically or selectively browse through links or discovered URLs, and that browsing will present additional requests to the target server and these requests are useful to also inject or examine for security flaws. Current web applications typically allow a certain amount of discovery of vulnerabilities.

The system 100 permits discovery of vulnerabilities when the SMS 105 is unable to elicit or observe links via a starting web page since a web page that links to other web pages is not returned to the SMS 105. The on-going communication or integration between the SMS 105 and the ADC 115 (or other network device 115 that is privy to traffic flow in applications) and the increased traffic flow information obtained with this communication or integration without a need for an additional network appliance devices is a significant advantage that are not achieved by conventional systems.

Figure 3:
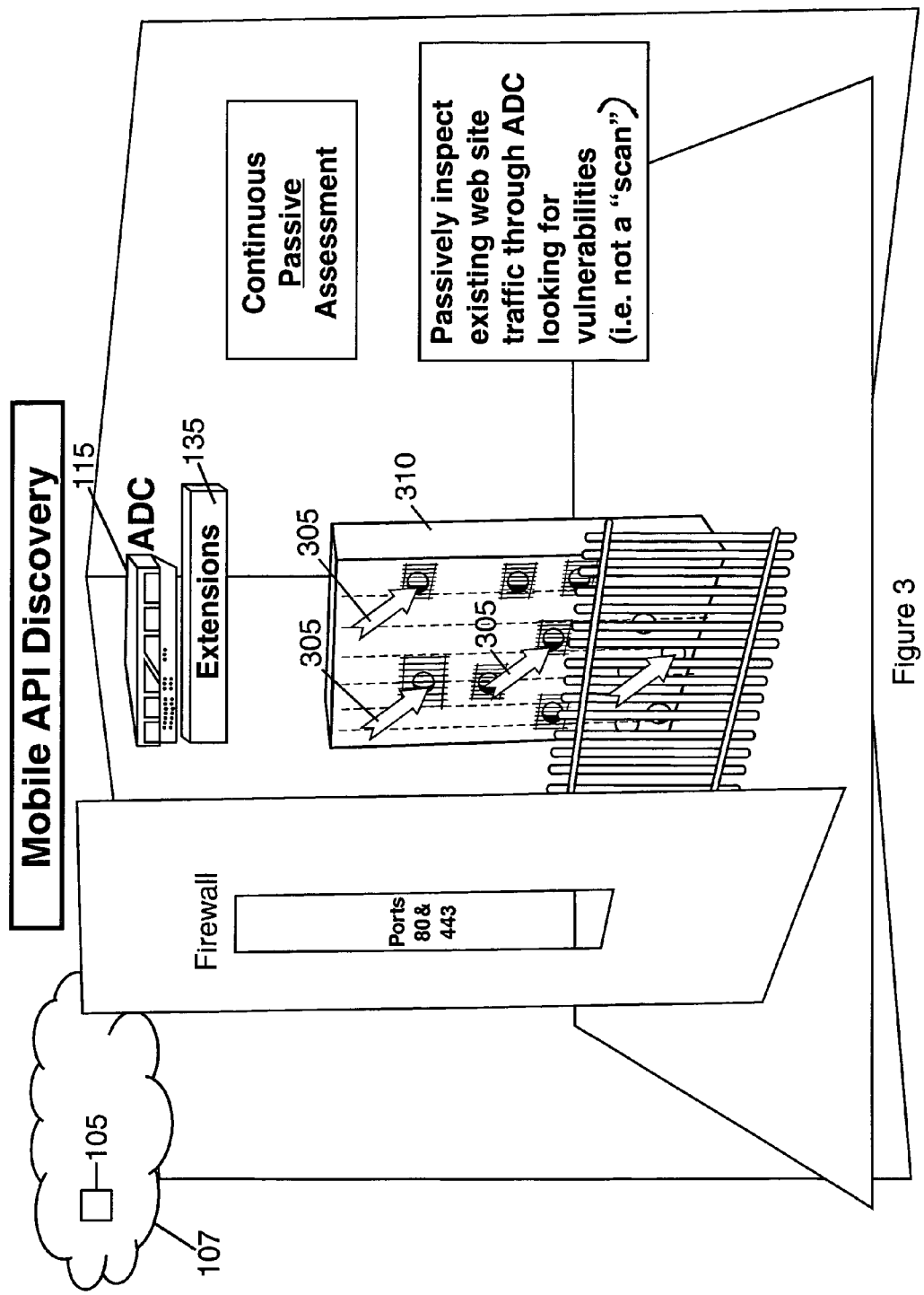
FIG. 3 is a graphics block diagram of a system in accordance with another embodiment of the invention.

FIG. 3 is a graphics block diagram of a system 100 in accordance with another embodiment of the invention. The SMS 105 can perform a new way to leverage full access to traffic through the ADC 115 in order to detect security flaws by a passive scanning method. The user examines existing normal traffic through the ADC 115 looking for security flaws. This passive inspection of existing website traffic 305 (of website 310) through the ADC 115 is a method for looking for vulnerabilities and is not a scan.

In the system 100, the user can view the results of the scan by the SMS 105 in order to perform a passive detection of certain classes of vulnerabilities via examination of the normal usage traffic due to other uses and systems communicating with the target application. It can be potentially impossible to navigate a web application and traverse all the important branches in each possible tree of navigation in the application. Therefore, the SMS 105 can record the traffic flowing through the ADC 115 and the user can determine via this observation of recorded traffic 205 (FIG. 2) if branches were not traversed or were otherwise missed, or if a branch is deemed important for adding to a set of entry points for testing. The user can observe from the SMS 105 if normal usage traffic are hitting links that are not exposed in the web application or may be otherwise missed during scanning. These links being hit by normal usage traffic can then be subsequently tested for vulnerabilities.

A passive observation of security flaws will typically involve observing the traffic and searching for security flaws in the traffic. The network device 115 is privy to the unencrypted traffic flow to applications and captures all of the web site responses to all web requests. The user, SMS 105, scanner in the SMS 105, and/or scanner supplied rules (or functionalities) that are resident on the network device 115 can search for certain classes of vulnerabilities such a forms that submit passwords without encryption (e.g., without SSL). There is no fault injection required in this passive observation method, and this passive observation method involves observing the traffic for security flaws that are evident from the existing traffic.

In this embodiment of the invention, the network device 115 can be a web application firewall 115 or an ADC 115, but can also be another type of network device 115 (or devices) that are privy to the traffic such as a switch, router, or another device.

In this embodiment of the invention, existing usage is observed in order to search for vulnerabilities. The SMS 105 is not exercising a scan of any target application when existing usage of the traffic to the application is being observed. In contrast, when an application(s) in an SUT is scanned for vulnerabilities, a non-passive activity of fault injection is needed in order to test the applications for vulnerabilities. However, a "fault injection" is not necessarily needed to test for all vulnerabilities. For example, the scanner (in the SMS 105) can test for these types of vulnerabilities via crawling and/or navigating without injecting faults.

Figure 4:
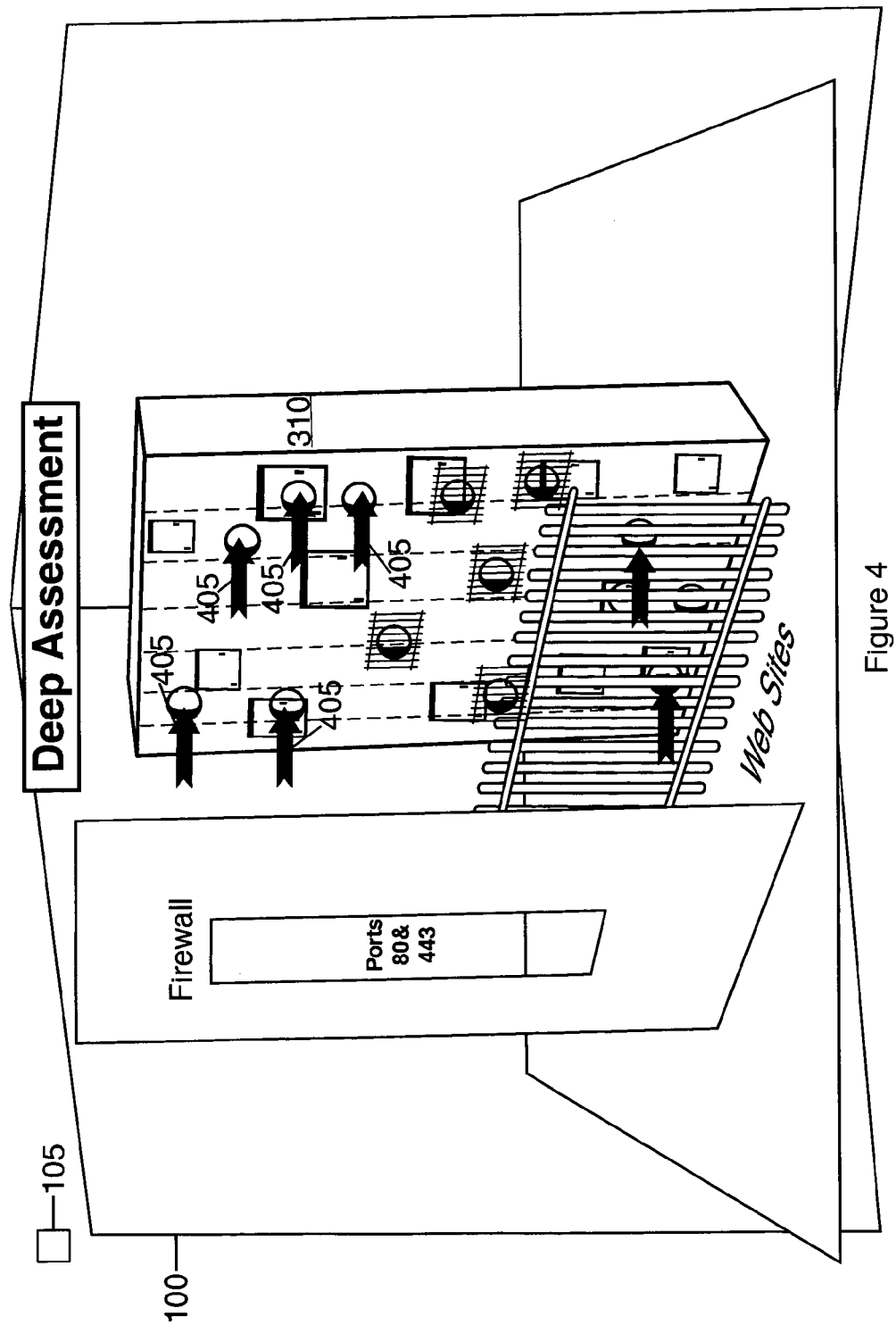
FIG. 4 is a graphics block diagram of a system in accordance with another embodiment of the invention.

FIG. 4 is a graphics block diagram in accordance with another embodiment of the invention. The user of a SMS 105 can provide manual assistance to the observation of a traffic 405 to the target web site 310 so that the observation is a semi-passive observation. An observation can also be a semi-passive observation of characteristics of the web service. One example of a semi-passive observation is when a request is submitted to the target system where the request has a password contained in a formalized password field. If the request is sent without a cryptographic protocol (e.g., Transport Layer Security or Secure Socket Layer) or sent without another type of encryption method, then a vulnerability is observed, independent of any fault injection being performed in the request. Therefore, in the system 100, the SMS 105 can perform a semi-passive detection of certain classes of vulnerabilities wherein the user will provide a minimal input (e.g., input of passwords or other values) in a request page, and the SMS 105 can examine the traffic between a user and systems with the target application. Such manual assistance during observation of traffic 405 may find additional vulnerabilities. This particular example can help a user to make sure that the application is properly exercised to give the passive observation system an opportunity to see all parts/usage scenarios of the target.

Figure 5:
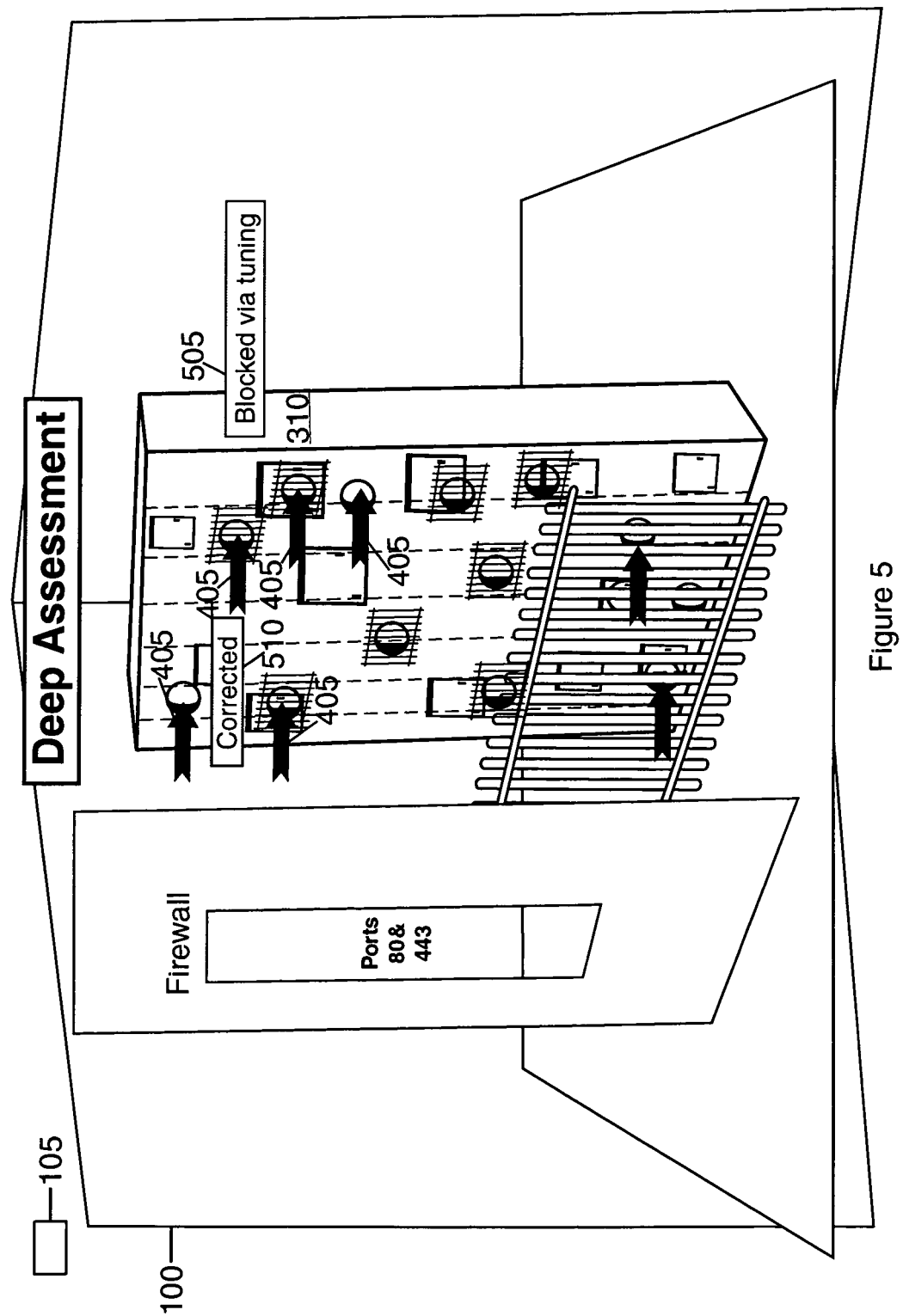
FIG. 5 is a graphics block diagram of a system in accordance with another embodiment of the invention.

Referring now to FIG. 5, based on this semi-passive observation, if a vulnerability is detected by the user (or SMS 105), the following subsequent corrective actions can be performed. The web site 310 can be tuned 505 to block the vulnerability. This may involve, for example, tuning the firewall or WAF, or an intrusion prevention system related to the web site 310. Additionally or alternatively, besides tuning 505, a correction 510 may otherwise be performed to remove the vulnerability if tuning 505 is not possible.

Additionally or alternatively, the SMS 105 is configured to be able to facilitate the tuning/configuration of a WAF (or similar purpose device/function) with the tuning/configuration based on activities not necessarily associated with the discovery or knowledge of vulnerabilities. For example, the SMS 105 is configured to facilitate, with the aid of a connected network device, and a method of allowing a user to express WAF rules for certain fields and pages, based on augmentation of client side interactions and/or traffic observation. As an example, the user interface of the SUT 105 could be dynamically augmented to allow field-by-field specification of acceptable input rules.

The system 100 permits identification and confirmation of the impact of fault injection (including injected content with unique identifiers) via monitoring of network traffic to find these injections in secondary communications from web servers to databases, file systems, web services, and other communications with other web servers. The details of these identifications and confirmations of impact will be discussed below.

Figure 6:
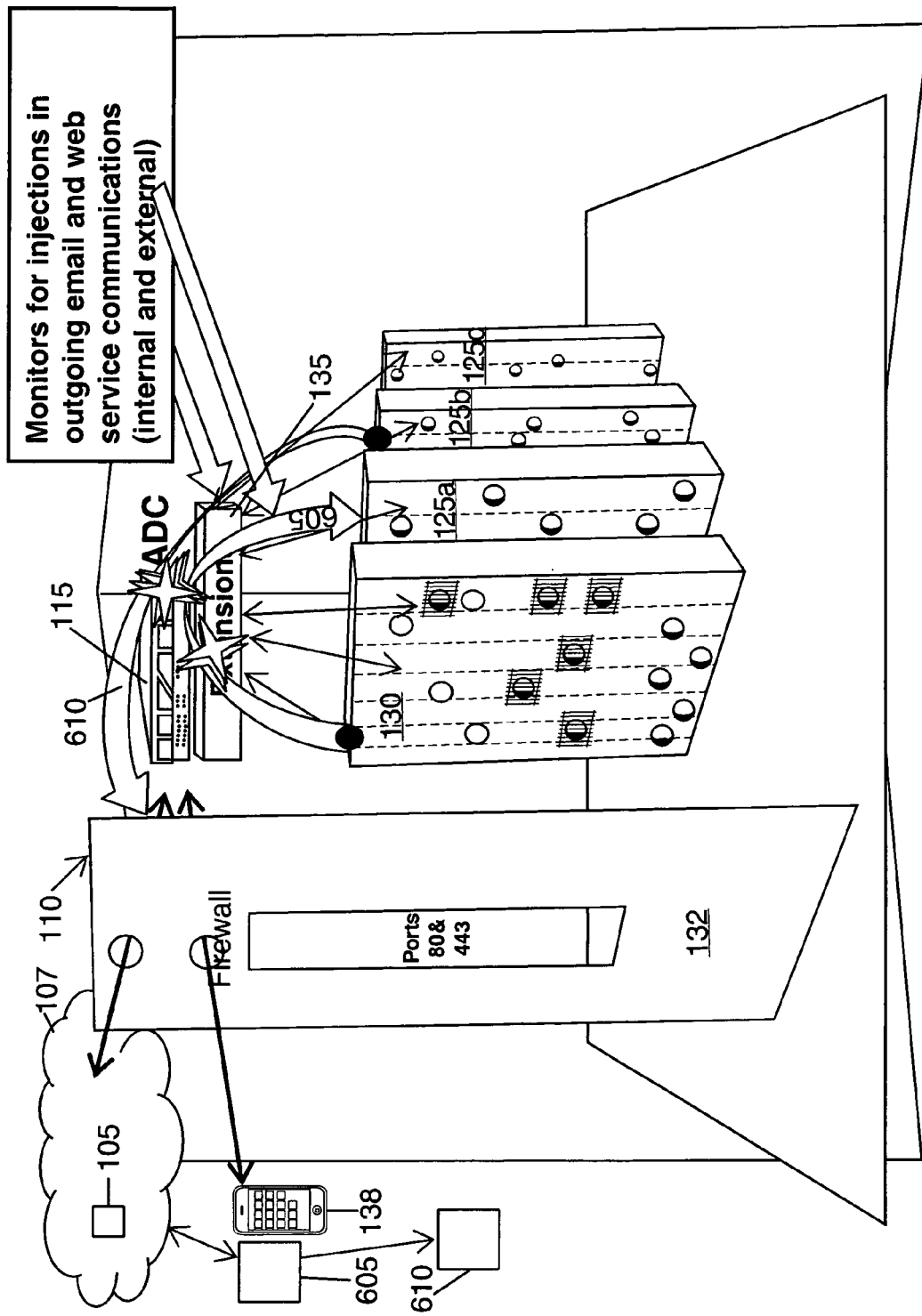
FIG. 6 is a graphics block diagram of a system in accordance with another embodiment of the invention.

This following discussion is with reference to FIG. 6. A fault injection in one particular field of a request may cause an impact in the secondary communications. For example, an example fault injection value (which may be just controlled injected values for the purposes of probing impacts and are therefore not necessarily fault injections) such as "$$$HELLO" may cause an email message (or another secondary communication) to be sent with this value or with other un-intended content or other un-intended modifications. These secondary communications will flow through one or more of the network devices 115 (which can be an ADC 115 and/or a web application firewall 115) In an embodiment of the invention, the security testing system 105 can be integrated with (or communicatively coupled with) one or more network devices 115. The security testing system 105 can then be configured to look, via the network devices 115, for certain unique strings and save the found unique strings or the security testing system 105 can poll the network devices 115 in a later time for any unique strings that are in a traffic captured by the network devices 115.

An advantage of observing secondary communications that occur due to an original communication is that a fault injected requests is not provided to the system under test. A possible disadvantage is that this original communication may have is a negative impact in the system under test. For example, the original communication may cause a fault of having hundreds of emails to be sent to particular email inboxes of accounts in the system under test, or other faults. An embodiment of the invention advantageously avoids a negative impact by a fault-injected original communication on secondary communications by allowing a user to observe (via information saved or displayed in the security testing system 105) the behavior of secondary communication in response to a normal use of an original communication. Since the network device 115 is privy to the secondary communications of applications in the system under test, the user of the security testing system 105 will have additional information to observe or analyze regarding the secondary communications. If a vulnerability is detected or if a fault occurs, the user can make corrections such as terminating the fault occurrence or slowing down or compensating for the fault occurrence, or other appropriate corrective actions.

However, these secondary communications may be indicative of neither vulnerabilities of faults, and yet these communications may still have an undesirable impact due to sheer volume of data and/or junk data.

FIG. 6 is a graphics block diagram of the system 100 showing an example of the traffic monitoring as described above in an embodiment of the invention. In the specific example of monitoring email traffic and web service traffic, the ADC 15 can capture the traffic through the external website 130 and internal websites 125a-125c. Based on this captured traffic, the SMS 105 can allow the user to monitor for injections in the outgoing email messages and/or injections in the web service communications. The ADC 115 will capture internal communications 605 between the external website 130 and any of the internal websites 125a-125c and communications between the internal websites 125a-125c. The SMS 105 can then save or display these communications 605 and 610. From the communications 605 and 610, the user of the SMS 105 can detect and/or confirm vulnerabilities and/or perform data leak detections or other security analysis. It is understood in the description herein that the number of internal websites and internal communications or secondary communications may vary in number among different SUTs 102.

As discussed above, the SMS 105 is configured with components and software to communicate with the ADC 115, and various methods described above can facilitate this communication or integration between the SMS 105 and ADC 115. As a result, an embodiment of the invention advantageously avoids additional hardware appliances or additional network devices that are otherwise required in conventional systems for capturing data in a system under test. The SMS 105 (and/or the ADC 115) can be configured with a configuration module 605 with rules or triggers (e.g., in software code) that will detect certain indicators in the traffic flow. Additionally or alternatively, the module 605 can also be configured to report the captured traffic flow to a designated destination 610 which may be a server, an allocated memory in a suitable device or a memory area of the SMS 105, or other suitable storage space. Additionally or alternatively, the module 605 is configured with a log management functionalities so that the module 605 can log or save, record, and/or report (to destination 610) the captured traffic flow so that the user of the SMS 105 is not required to monitor the traffic flow in real-time.

Additionally or alternatively the module 605 (which can be implemented in the SMS 105 and/or in the ADC 115) may be configured with deep packet inspection functionality and capability. Therefore, the module 605 can detect for strings in a captured traffic flow and/or detect for unique requests, and detection of particular strings or string sets can be selectively programmed by the user in a trigger or rule in the module 605.

Figure 7:
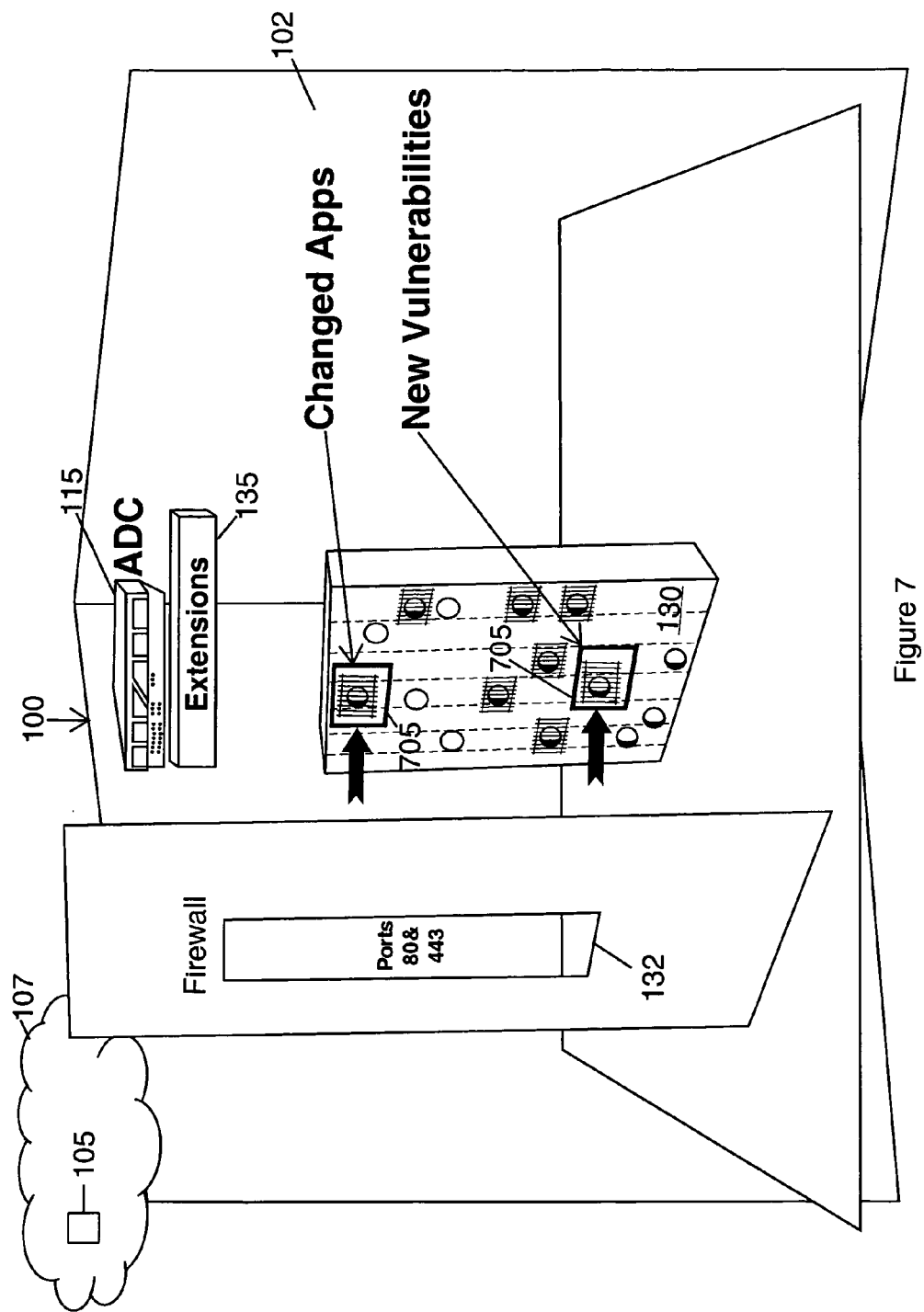
FIG. 7 is a graphics block diagram of a system in accordance with another embodiment of the invention.

This following discussion is with reference to FIG. 7. If a new application is in the system under test and/or if a current application in the system under test has now an updated version, these new application and/or updated application version will require vulnerability testing due to the new and/or modified functionalities in these applications. A new type of request or a new class of requests can be indicative of a new or updated application in the system under test.

FIG. 7 is a graphics block diagram of the system 100 showing an example of an application change detection capability as described above in an embodiment of the invention. The system 100 can automatically detect changes to web applications 705 and initiate scans of the new or modified applications in the SUT 102 in a timely manner. Such subsequent scans can search for new vulnerabilities in a changed (or updated) application 705 or new application 705. The subsequent scan to be performed by the SMS 105 can be a complete scan that crawls or navigates through the entire application or it can be a narrower-type scan wherein the new type of request(s) is used in the scan of the new or updated application 705. Therefore, the system 100 facilitates a prompt vulnerability re-assessment of updated web sites 130.

Figure 8:
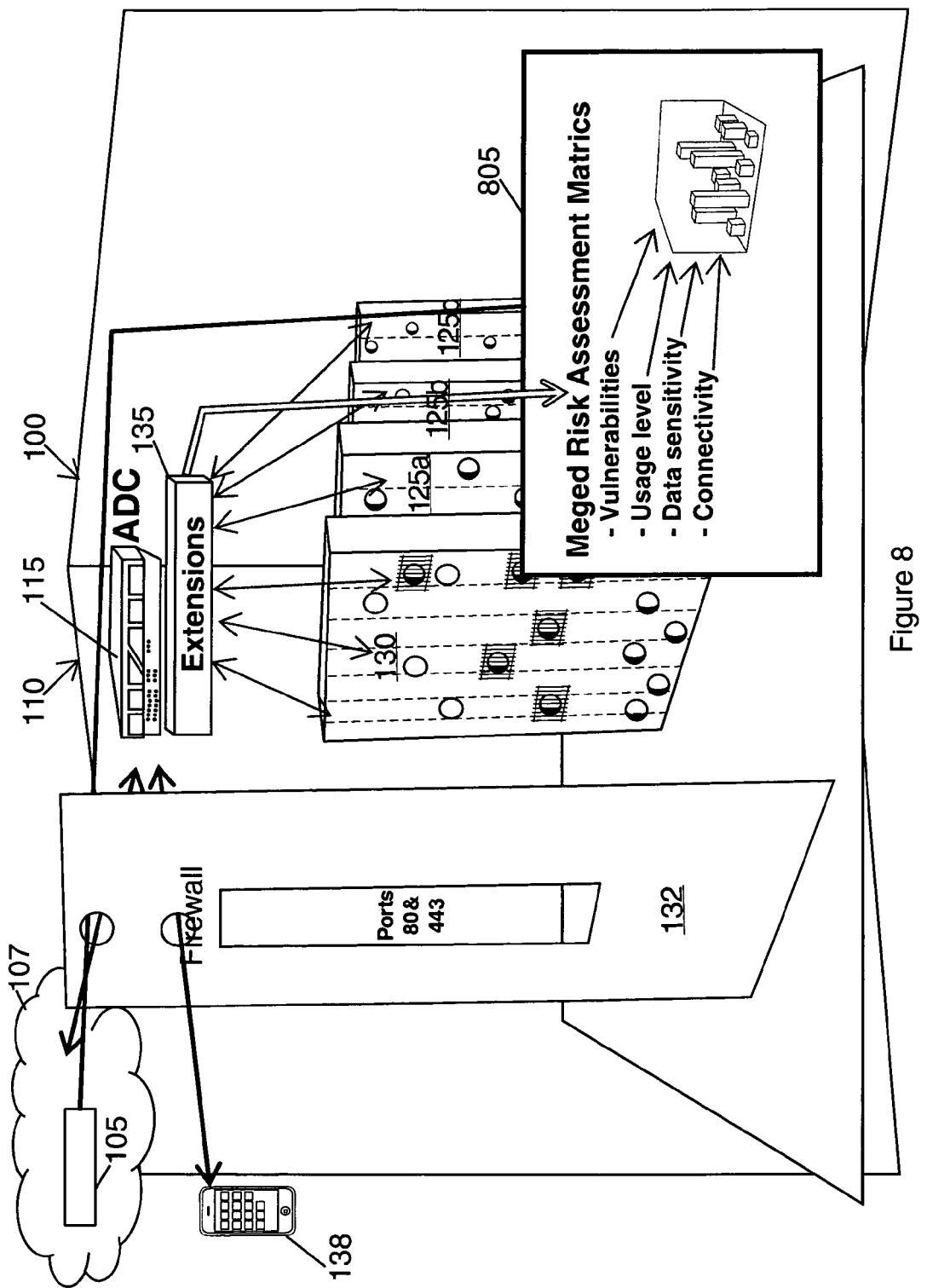
FIG. 8 is a graphics block diagram of a system in accordance with another embodiment of the invention.

FIG. 8 is a graphics block diagram of the system 100 showing an example of an enhance risk management functionality provided by an embodiment of the invention. In large scale computing environment (e.g., an enterprise environment) where there may be hundreds or thousands of web applications, it is typically difficult to understand the security flaw risks of those applications. Additionally, organizations will differ in their priorities concerning security risks since they differ in their stored data, transaction data, operation requirements, customer requirements, brand name consideration, partners or geographical considerations, and/or other considerations. Therefore, organizations will tend to prioritize and evaluate security risks on higher profile web applications as opposed to evaluating security risks on all of their web applications. Security risks in the lower profile web applications may not possible be elicited by simply observing the network traffic through these lower profile (or lower priority) web applications.

It may be important to also evaluate the security risks in these lower profile applications if the lower profile application, for example, exercises a web service that gives the lower profile application an access to a higher profile application that may have sensitive or confidential data. Additionally, security risk personnel may not remember (or may not yet be aware) of the interface between lower profile applications and higher profile applications. Accordingly, it is important to provide a method to evaluate the security risks in these lower profile applications as well.

In an embodiment of the invention, the ADC 115 can capture traffic between a high profile web application and a low profile web application, and the SMS 105 can provide the captured traffic for observation by a user for purposes of security risk evaluations.

In an embodiment, the ADC 115 includes a risk assessment metrics module 805 that captures and aggregates various information about the connectivity between applications. This module 805 can incorporate the connectivity detection and determination functionalities of currently available software tools that evaluate connectivity information and characteristics between applications in a network.

The module 805 can, for example, aggregate and assign a risk metric to: (1) vulnerabilities of an application (whether the application is high profile application or a low profile application), (2) usage level of the application, (3) data sensitivity of the application, (4) connectivity characteristics (including, e.g., connectivity or traffic flow with high profile applications) of the application, (5) nature and content of the traffic through the application, (6) the amount and the particular web services consumed by the application, and/or (7) other risk-related factors. The risk metric values that are collected and/or calculated by the module 805 and sent by the ADC 115 to the SMS 105. The user can then review the risk metric values for vulnerability assessments of any application in the SUT or other purposes. These risk metric values provide a type of continues feedback loop to help a user tune applications based on vulnerability risks and also provide a more effective motivation to encourage more blocking and improve discovery of vulnerabilities. The risk metrics are just one class of characterization of the SUT or elements in the SUT. These characterizations provide additional information about the SUT that may be useful in various ways. Other types of characterizations can be used to characterize the SUT or elements in the SUT. For example, another characterization of the SUT (or elements in the SUT) is a characterization of an impact of benign injections. As another example, another characterization of the SUT (or elements in the SUT) is a characterization of an impact of fault injections. Other characterizations are possible.

Figure 9:
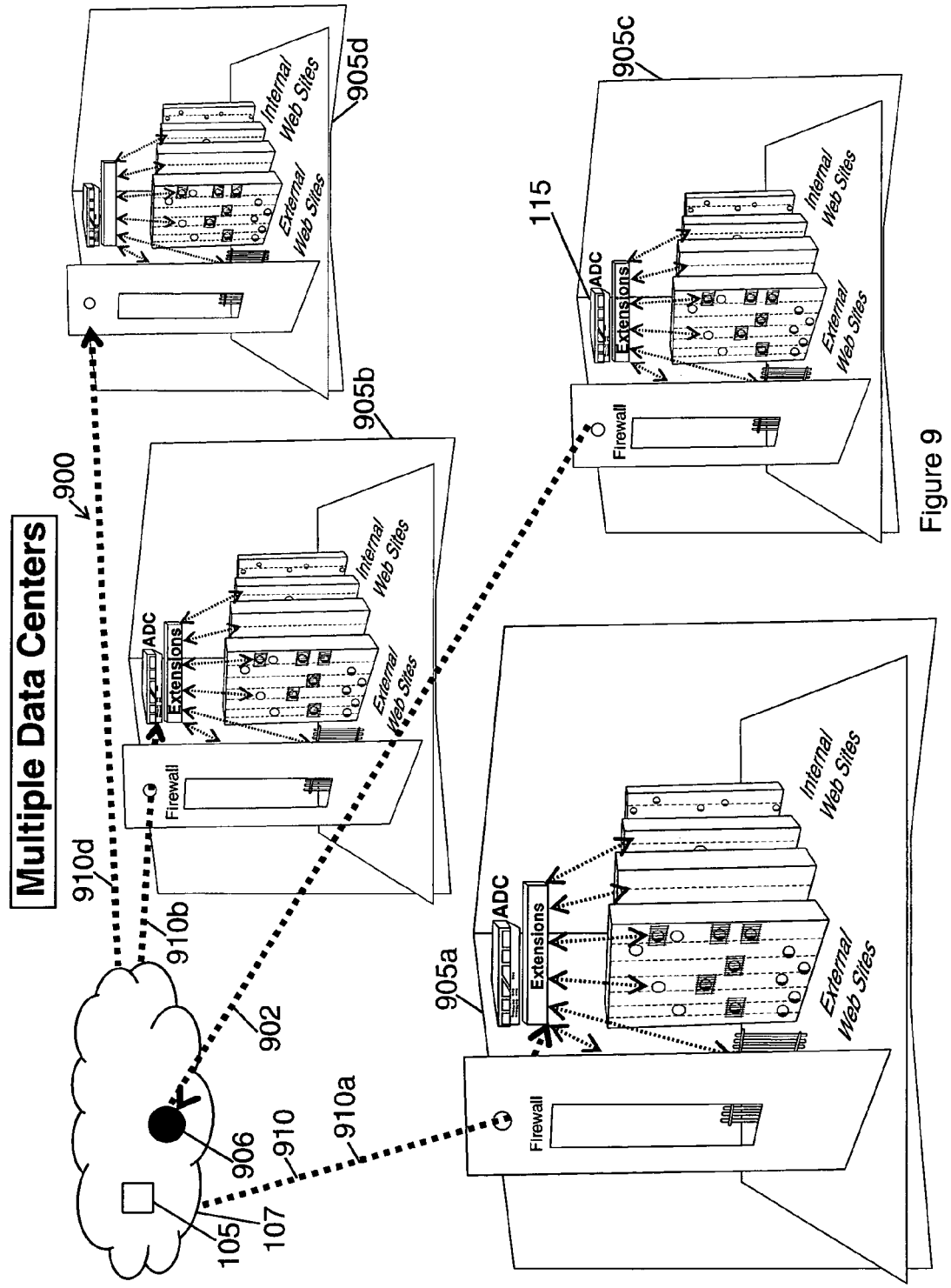
FIG. 9 is a graphics block diagram of a system capable of communications with data centers, in accordance with another embodiment of the invention.

FIG. 9 is a block diagram of a system 900 in accordance with another embodiment of the invention. The system 900 stops new types of attacks by quickly sharing new vectors 910 to multiple data centers. The vector sharing system 906 may be communicatively coupled to the SMS 105 and shares the new vectors to multiple data centers. The data center 905c has an ADC 115 that can capture traffic as similarly discussed above. Each data center 905a, 905b, 905c, and 905d have the same components as a system under test 102 of FIG. 1, such as, an ADC 115, external websites 130, and internal websites 120 and applications.

The captured traffic 902 from the data center 905c is processed by the SMS 105, as similarly discussed above. Additionally, the vector sharing system 906 can forward traffic information 910a, 910b, and 910d to the other data centers 905a, 905b, and 905d, respectively. This traffic information 910a, 910b, and 910d can be the captured traffic 902 or can be information relating to a vulnerability analysis of the traffic information 902. As a result, the vectors 910a, 910b, 910d will permit the data centers 905a, 905b, and 905d, respectively, to tune their intrusion prevention devices to guard against vulnerabilities indicated in the vectors 910a, 910b, and 910d. Therefore, the system 906 identifies malicious traffic on the network by looking at a behavior that falls outside of a previously observed normal behavior. The system 906 then communicates descriptors 910 (or vectors 910) about this behavior to other systems (e.g., data centers 905a and 905d) in other locations to help protect these other systems from new attack vectors.

Figure 10:
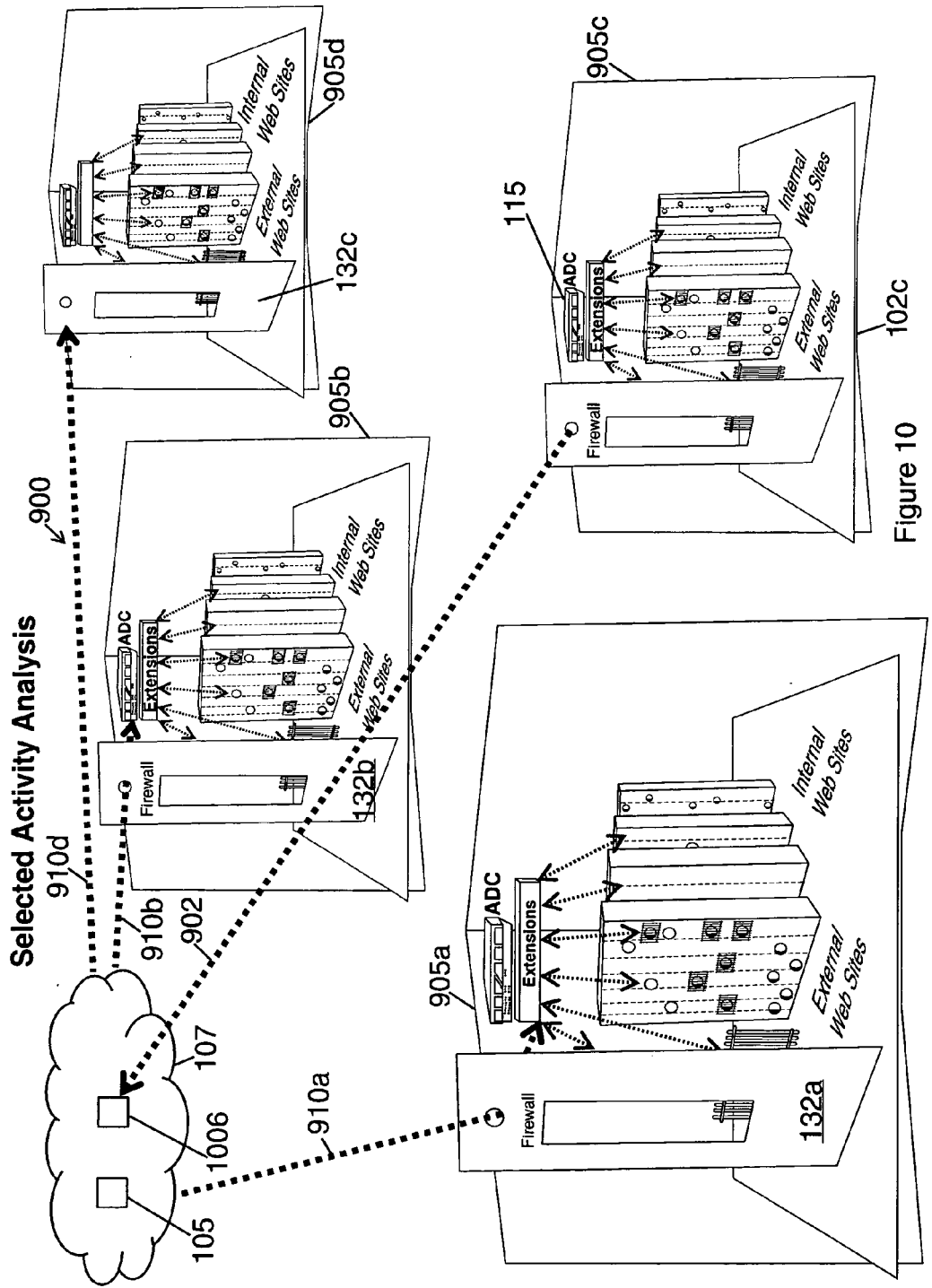
FIG. 10 is a graphics block diagram of a system capable of communications with data centers, in accordance with another embodiment of the invention.

FIG. 10 is a block diagram of the system 900 in accordance with another embodiment of the invention where the system 900 has a cloud-based server 1006 with resources or capabilities to perform computing functions and vulnerability assessments that are not practical for the any of the data centers 905a-905d to perform locally. This cloud-based computing capability (as facilitated by components in the cloud network 107) serves customers or markets that are unable to afford WAF hardware. Additionally, the cloud-based risks assessments can be extended to these customer or markets via the centralized computing in the server 1006. Additionally, on-demand intelligence to WAF processing can be provided to these customer and markets.

Therefore, the cloud-based server 1006 feeds information 910a, 910b and 910d to blocking devices (e.g., web application firewalls) in data centers 905a, 905b, and 905d, respectively, based on the crawling of the SMS 105 in the SUT 102c and observations 902 (or traffic 902) captured by the ADC 115 or another network device 115 in the SUT 102c. The data centers 905a, 905b, and 905d can then better judge appropriate traffic and inappropriate traffic based on the transmitted information 910a, 910b, and 910d, respectively.

Figure 11:
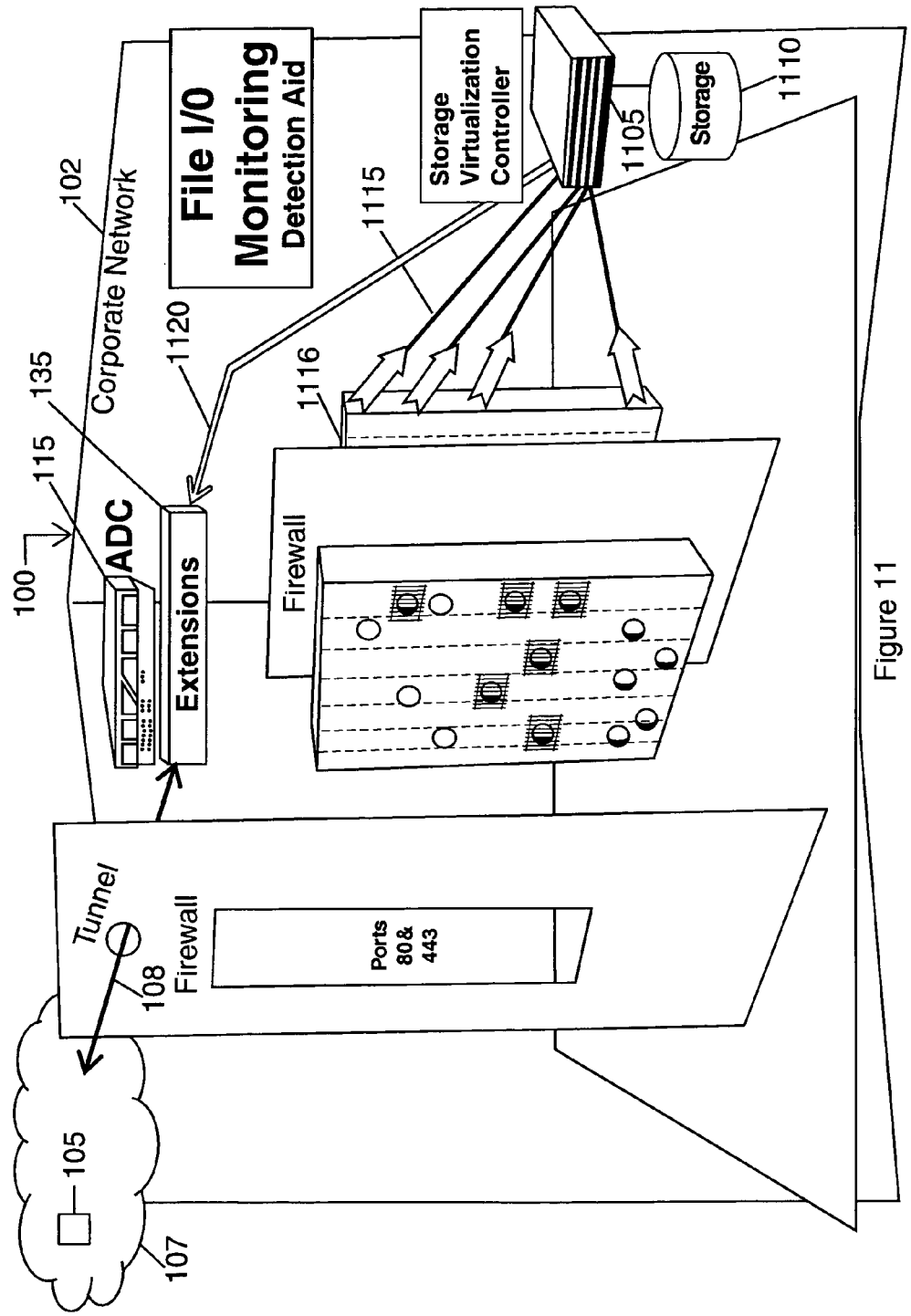
FIG. 11 is a graphics block diagram of a system in accordance with another embodiment of the invention.

FIG. 11 is a graphics diagram of the system 100 that performs file input/output (I/O) monitoring in accordance with an embodiment of the invention. The extension 135 provides functionality so that the ADC 115 can access a storage virtualization controller 1105 that controls a storage device 1110 within the SUT 102. The controller 1105 is privy to storage-related network traffic to and from the storage device 1110. The extension 135 can be configured to inject an artificial content 1120 to data 1115 that is stored to the storage device 1110 and read from the device 1110.

Read and write operations to the storage device 1110 is performed by the file system 1116 along with the controller 1105. This injection of artificial content 1120 is then observed in order to detect malicious behavior or fault occurrence in the SUT 102 and also allow the user to make additional observations such as, for example, whether the fault injection in the read data 1115 will impact the web user interface of the SUT 102. For fault content or artificial content that is injected by the extension 135 into the read data 1115, the user (or SMS 105) can detect any fault behavior or unexpected behavior or responses when that fault injected data is read. Thus, the system 100 provides a new method for vulnerability detection and vulnerability confirmation.

Figure 12:
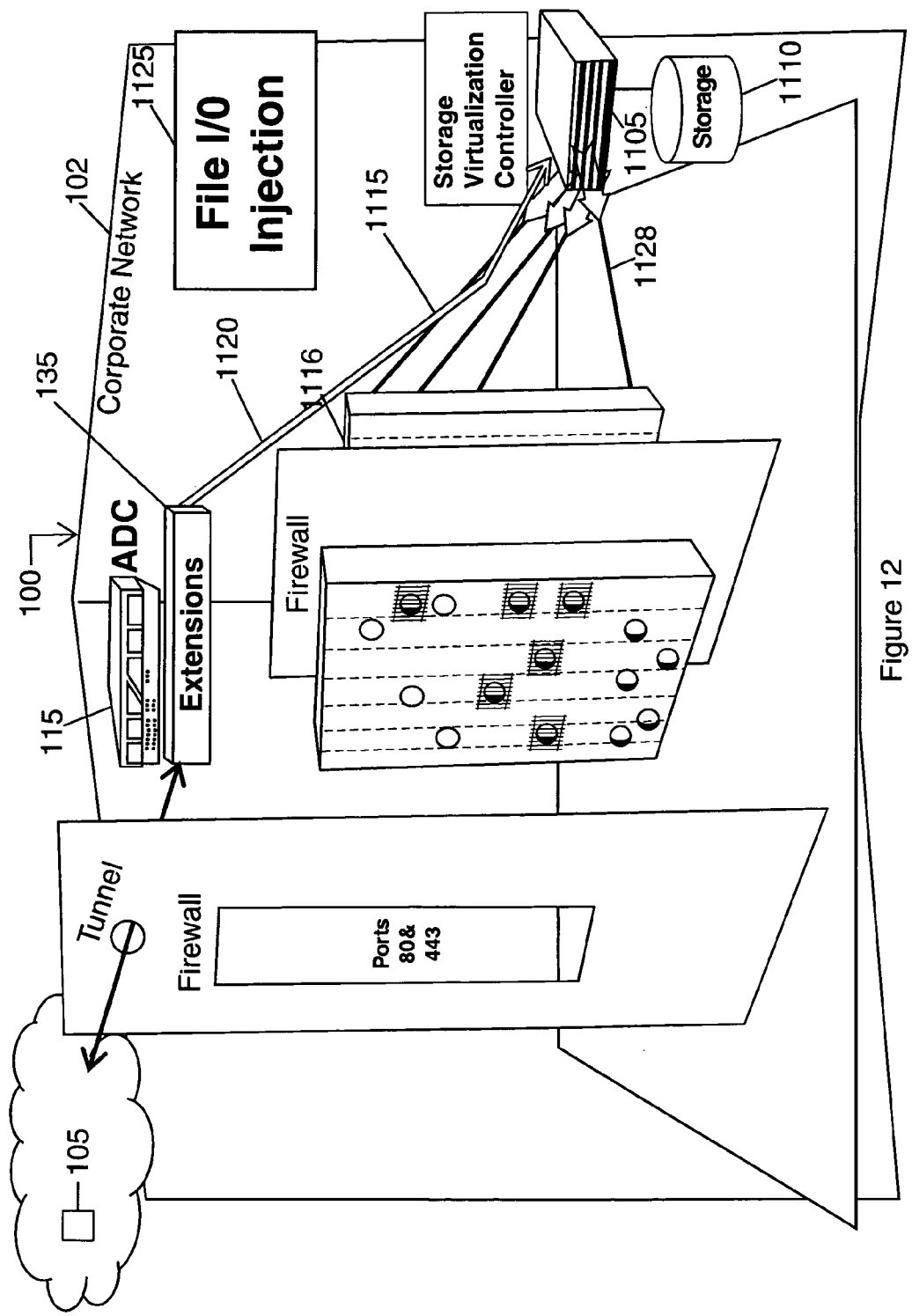
FIG. 12 is a graphics block diagram of a system in accordance with another embodiment of the invention.

FIG. 12 is a graphics block diagram of the system 100 wherein the extension 135 injects the fault content 1120 into the write data 1128 that is to be written into the storage device 1110. Fault occurrence or other behavior can be observed by the user when the fault injected write data 1128 is subsequently read from the storage device 1110.

Figure 13:
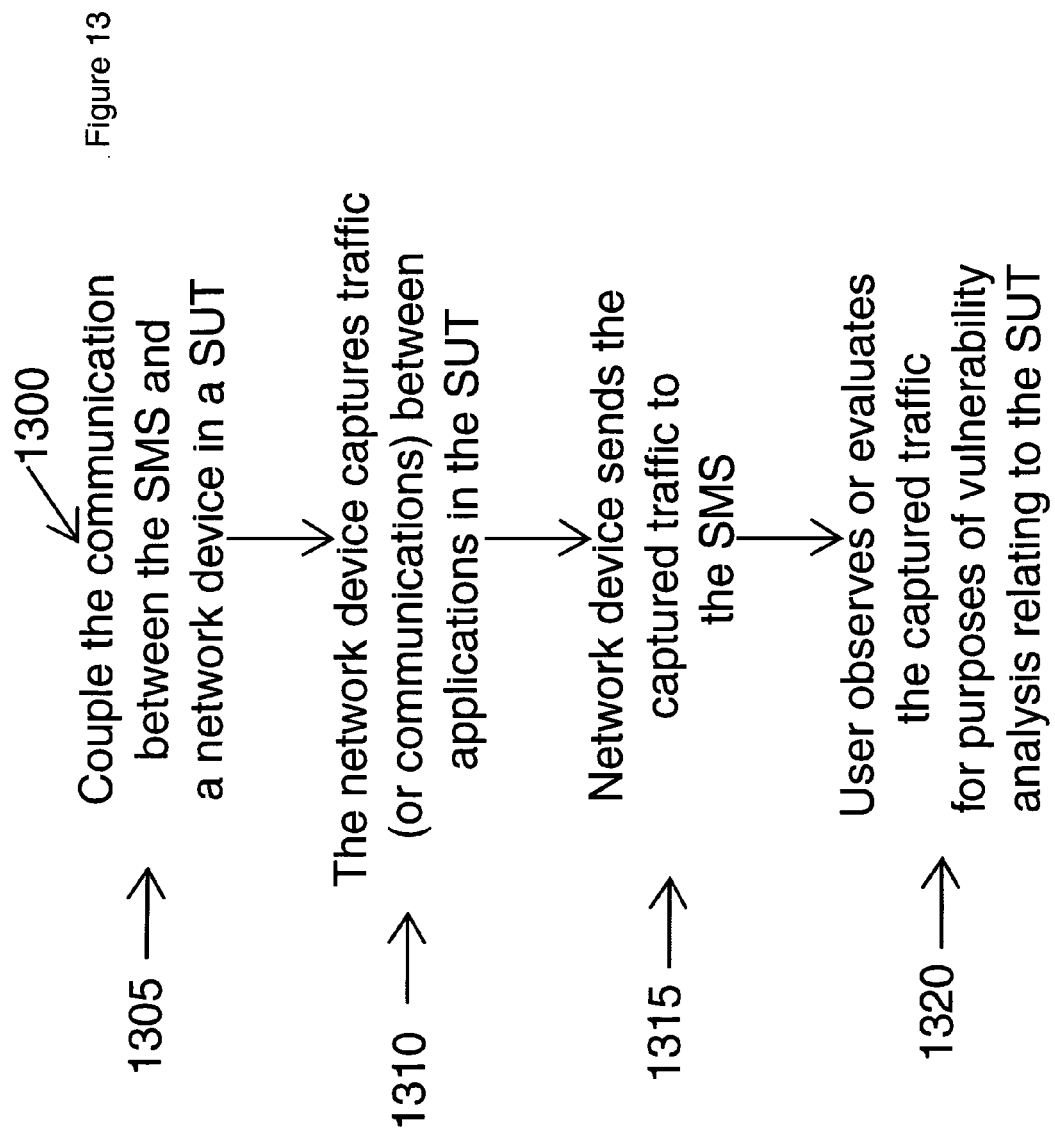
FIG. 13 is a flow diagram of a system in accordance with another embodiment of the invention.

FIG. 13 is a flow diagram of a general method 1400 in accordance with an embodiment of the invention. In sequence 1305, communication is coupled between an SMS 105 and a network device in an SUT. The SMS is external to the SUT. However, in other embodiments, the SMS is co-resident on the network device 115. As discussed above, the network device may be an ADC 115 or another network device 115 that is privy to communications flowing through applications in the SUT.

In sequence 1310, the network device captures the traffic (or communications) between applications in the SUT.

In sequence 1315, the network device sends the captured traffic to the SMS. Additionally or alternatively as discussed above, the network device sends, to the SMS, information relating to captured traffic.

In sequence 1320, the user (and/or SMS 105) can observe or evaluate the captured traffic (or information relating to the captured traffic) for purposes of vulnerability analysis relating to the SUT.

Figure 14:
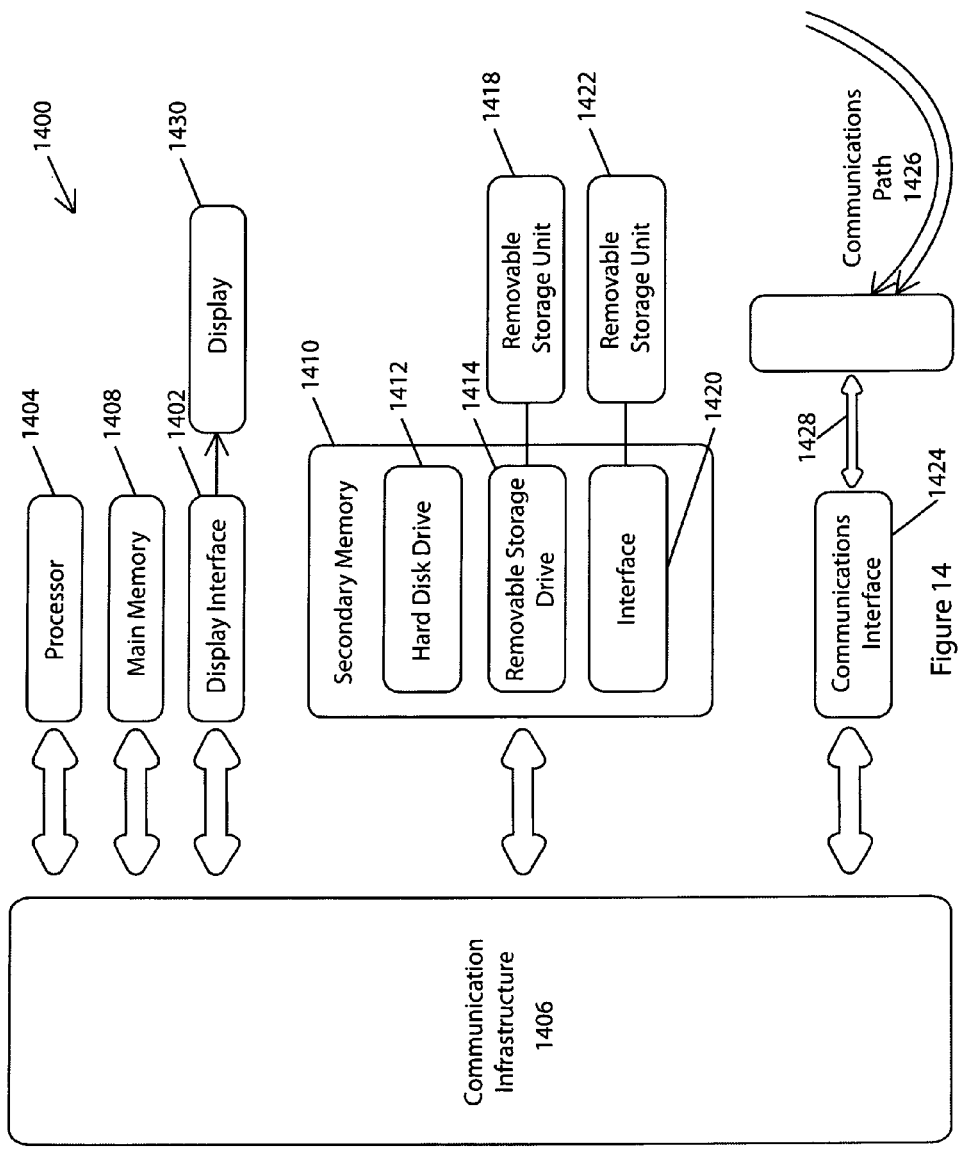
FIG. 14 is a block diagram of a computing system which can be used to implement the hardware components in the devices that can used in an embodiment of the invention.

FIG. 14 is a block diagram of a computing system 1400 which can be used to implement the hardware components in the devices that can used in an embodiment of the invention. In one aspect, system 100 may be directed toward one or more computer systems capable of carrying out the functionality described herein. An example of a computer system 1400 is shown in FIG. 14. It is understood, however, that some devices in FIG. 1 or other Figures herein may not include all of the hardware components in FIG. 14, depending on the particular device.

Computer system 1400 includes one or more processors, such as processor 1404. Processor 1404 may be connected to a communication infrastructure 1406, such as a communications bus or network, for example. Various software aspects are described in terms of this exemplary computer system. After reading this description, it will become apparent to a person skilled in the relevant art(s) how to implement the invention using other computer systems and/or architectures.

Computer system 1400 can include a display interface 1402 that forwards graphics, text and other data from communication infrastructure 1406, or from a frame buffer (not shown), for display via display unit 1430. Computer system 1400 may also include a main memory 1408, preferably a random access memory (RAM), and may further include a secondary memory 1410. Secondary memory 1410 may include, for example, a hard disk drive 1412 and/or a removable storage drive 1414, representing a floppy disk drive, a magnetic tape drive, or an optical disk drive, for example. Removable storage drive 1414 reads from and/or writes to a removable storage unit 1418 in a manner well known in the relevant art. Removable storage unit 1418 represents a floppy disk, magnetic tape, or an optical disk, which is read by and written to by removable storage drive 1414. As can be appreciated, removable storage unit 1418 includes a computer usable storage medium having stored therein computer software and/or data.

In alternative aspects, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface, such as may be found in video game devices, a removable memory chip, such as an erasable programmable read only memory (EPROM), or programmable read only memory (PROM), and associated socket and other removable storage units 1422 and interfaces 1420, which allow software and data to be transferred from the removable storage unit 1422 to computer system 1400.

Computer system 1400 may also include a communications interface 1424. Communications interface 1424 allows software and data to be transferred between computer system 1400 and external devices. Examples of a communications interface 1424 may include a modem, a network interface such as an Ethernet card, a communications port, and a Personal Computer Memory Card International Association (PCMCIA) slot and card. Software and data transferred via communications interface 1424 are in the form of non-transitory signals 1428 which may be electronic, electromagnetic, and optical or other signals capable of being received by communications interface 1424. Signals 1428 may be provided to communications interface 1424 via a communications path or channel 1426. Channel 1426 may carry signals 1428 and may be implemented using wire or cable, fiber optics, a telephone line, a cellular link, a radio frequency (RF) link, and other communications channels.

In this document, the terms "computer program medium" and "computer usable medium" are used to generally refer to media such as removable storage drive 1414, a hard disk installed in hard disk drive 1412, and signals 1428. These computer program products provide software to computer system 1400, wherein the present invention is directed to such computer program products.

Computer programs (also referred to as computer control logic), may be stored in main memory 1408 and/or secondary memory 1410. Computer programs may also be received via communications interface 1424. Such computer programs, when executed, enable computer system 1400 to perform the features of the present invention, as discussed herein. In particular, the computer programs, when executed, enable processor 1404 to perform the features of the present invention. Accordingly, such computer programs represent controllers of the computer system 1400.

In an aspect where the invention is implemented using software, the software may be stored in a computer program product and loaded into computer system 1400 using removable storage drive 1414, hard drive 1412 or communications interface 1424. The control logic (software), when executed by processor 1404, causes processor 1404 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown herein in various drawings may be configured as a desktop, a laptop, a server, a tablet computer, a PDA, a mobile computer, an intelligent communications device or the like. In yet another aspect, the invention may be implemented using a combination of both hardware and software.

Other variations and modifications of the above-described embodiments and methods are possible in light of the teaching discussed herein.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system for security management, the system comprising:
    a security management system (SMS) that is outside a system under test (SUT); and
    a network device in the SUT to:
    transmit traffic information in the SUT to the SMS at a first time, wherein the traffic information includes a captured request, the SMS to transmit the captured request to an application program interface (API) of a server, separate from the network device, in the SUT at a second time later than the first time, and
    in response to the SMS sending the captured request to the API:
        capture traffic between the server and another device, separate from the server and the network device, in the system under test, the traffic sent by the server in response to the captured request received via the API, and
    transmit the traffic to the SMS, the SMS to scan the traffic for vulnerabilities, wherein the SUT includes a firewall configured to filter traffic from the SMS to devices in the SUT and to block the captured request when the captured request is transmitted to the server by a device outside the SMS, the network device configured to at least one of set up tunneling for the SMS, alter communications output from the SUT, or perform a fault injection in the captured request transmitted by the SMS.

2. The system of claim 1, wherein the SMS and the network device are communicatively coupled together.

3. The system of claim 1, wherein the SMS is configured to request the traffic information from the network device.

4. The system of claim 1, wherein the SMS is configured to request that the network device perform an analysis of the traffic information.

5. The system of claim 1, wherein the network device includes an Application Delivery Controller (ADC).

6. The system of claim 1, wherein the traffic information includes traffic flowing through the SUT.

7. The system of claim 1, wherein the SMS is configured to select the captured request from the traffic information.

8. The system of claim 1, wherein the SMS receives the traffic through a tunnel in the firewall.

9. A method in a network device, the method comprising:
    transmitting traffic information in a system under test (SUT) to a security management system (SMS) at a first time, wherein the traffic information includes a captured request; and
    in response to detecting that the SMS sends the captured request to an application program interface of a server, separate from the network device, in the SUT at a second time after the first time:
    capturing traffic between the server and another device, separate from the server and the network device, in the system under test, the traffic sent by the server in response to the captured request received via the API, and
    transmitting the traffic to the SMS for scanning for vulnerabilities, wherein the SUT includes a firewall configured to filter traffic from the SMS to devices in the SUT and to block the captured request when the captured request is transmitted to the server by a device outside the SMS, the network device configured to at least one of set up tunneling for the SMS, alter communications output from the SUT, or perform a fault injection in the captured request transmitted by the SMS.

10. The method of claim 9, wherein the SMS requests the network device to perform an analysis of the traffic information.

11. The method of claim 9, wherein the traffic information includes traffic flowing through the SUT.

12. The method of claim 9, wherein the SMS selects the captured request from the traffic information.

13. The method of claim 9, wherein the SMS receives the traffic through a tunnel in the firewall.

14. The method of claim 9, wherein the SMS requests the traffic information from the network device.

15. A tangible computer readable storage disk or storage device medium comprising instructions that, when executed, cause a network device to at least:
    transmit traffic information in a system under test (SUT) to a security management system (SMS) at a first time, wherein the traffic information includes a captured request; and
    in response to detecting that the SMS sends the captured request to an application program interface of a server, separate from the network device, in the SUT at a second time after the first time:
    capture traffic between the server and another device, separate from the server and the network device, in the system under test, the traffic sent by the server in response to the captured request received via the API, and transmit the traffic to the SMS for scanning for vulnerabilities, wherein the SUT includes a firewall configured to filter traffic from the SMS to devices in the SUT and to block the captured request when the captured request is transmitted to the server by a device outside the SMS, the network device configured to at least one of set up tunneling for the SMS, alter communications output from the SUT, or perform a fault injection in the captured request transmitted by the SMS.

\* \* \* \* \*